United States Patent [19]

Okura

[11] Patent Number: 5,270,759
[45] Date of Patent: Dec. 14, 1993

[54] APPARATUS FOR STOPPING DOWN DIAPHRAGM TO AN INTERMEDIATE SETTING, UPON SETTING DIAPHRAGM TO A DESIRED SETTING

[75] Inventor: Zenichi Okura, Tokyo, Japan

[73] Assignee: Asahi Kogaku Kogyo Kabushiki Kaisha, Tokyo, Japan

[21] Appl. No.: 374

[22] Filed: Jan. 4, 1993

Related U.S. Application Data

[63] Continuation of Ser. No. 612,992, Nov. 15, 1990.

[30] Foreign Application Priority Data

Nov. 15, 1989 [JP] Japan .................. 1-296998
Nov. 15, 1989 [JP] Japan .................. 1-296999

[51] Int. Cl.$^5$ ............................................. G03B 9/07
[52] U.S. Cl. .................................................. 354/274
[58] Field of Search ............... 354/232, 270, 271.1, 354/272, 274, 286, 453

[56] References Cited

U.S. PATENT DOCUMENTS

| | | | |
|---|---|---|---|
| 3,687,047 | 8/1972 | Ito | 354/274 |
| 4,081,811 | 3/1978 | Baab et al. | 354/272 |
| 4,344,689 | 8/1982 | Kohmoto et al. | 354/286 |
| 4,416,527 | 11/1983 | Okura | 354/272 |
| 4,464,040 | 8/1984 | Okura et al. | 354/455 |
| 4,589,750 | 5/1986 | Tomori et al. | 354/271.1 |
| 4,636,041 | 1/1987 | Kotaka et al. | 354/274 |

FOREIGN PATENT DOCUMENTS

| | | |
|---|---|---|
| 1062109 | 1/1963 | Fed. Rep. of Germany . |
| 2154891 | 4/1975 | Fed. Rep. of Germany . |
| 2435737 | 4/1980 | France . |

Primary Examiner—Michael L. Gellner
Assistant Examiner—J. K. Han
Attorney, Agent, or Firm—Sandler, Greenblum & Bernstein

[57] ABSTRACT

A diaphragm apparatus of a lens includes a diaphragm opening and closing ring and a diaphragm supporting ring for supporting a plurality of diaphragm blades and for opening and closing a diaphragm aperture in accordance with the relative rotation of the diaphragm blades. A diaphragm value setting ring sets a diaphragm value. A releasing member is actuated upon a release of a shutter to rotate the diaphragm opening and closing ring to thereby stop-down the latter. A cam mechanism operates in associated with the rotation of the diaphragm value setting ring to restrict the angular displacement of the diaphragm opening and closing ring into the stopping-down direction, and a stopping-down mechanism rotates the diaphragm supporting ring into the stopping-down direction in association with the rotation of the diaphragm value setting ring in a first angular range from a full open position of the diaphragm value setting ring to a predetermined intermediate diaphragm value thereof. A diaphragm data transmitting member, that is separate from the diaphragm value setting ring, transmits diaphragm value data to a camera body side. An associated mechanism that is provided between the diaphragm value setting ring and the diaphragm data transmitting member maintains the diaphragm data transmitting member to a predetermined position in the diaphragm range in which the diaphragm aperture changes, regardless of an angular position of the diaphragm value setting ring.

21 Claims, 3 Drawing Sheets

APPARATUS FOR STOPPING DOWN DIAPHRAGM TO AN INTERMEDIATE SETTING, UPON SETTING DIAPHRAGM TO A DESIRED SETTING

This application is a continuation of application Ser. No. 07/612,992, filed Nov. 15, 1990, (status pending).

BACKGROUND OF THE INVENTION

1. Field of the Invention

The present invention is directed to a diaphragm apparatus of a lens that is attached to a single-lens reflex camera, and it also relates to an apparatus for transmitting photometric data on the diaphragm apparatus to the camera body.

2. Description of the Related Art

Usually, single-lens reflex cameras have an automatic diaphragm device in which a diaphragm is fully open in order to provide a bright field of view, the diaphragm being stepped down to a predetermined diaphragm value only immediately before the shutter is released. In such an automatic diaphragm device, it is necessary to provide a stopping-down device on the camera body side or the lens side in order to confirm that the predetermined diaphragm value has been effected.

SUMMARY OF THE INVENTION

The primary object of the present invention is to provide a diaphragm apparatus in which no stopping-down device is necessary in a predetermined diaphragm value range.

The inventor of the present invention has found that there is no substantial decrease in the brightness of the finder field of view when the open F-number of the lens is smaller than a predetermined value; this is true if the lens is sufficiently bright, even if the diaphragm diameter is made smaller than a diameter (open diameter) corresponding to the open aperture. A diaphragm effect (soft focus effect) can always be visibly confirmed through the finder by varying the actual diaphragm diameter in accordance with the set diaphragm diameter at a diaphragm value from the open diameter to a predetermined intermediate diameter. On the other hand, when the set diaphragm value is above a predetermined value (that is, when the lens is dark), it is difficult to visibly confirm the diaphragm effect through the finder. Thus, it is advisable to rely on an automatic diaphragm mechanism when the lens is dark.

Note that the "soft focus effect" mentioned above refers to an effect due to a spherical aberration of the lens, which deteriorates as the diaphragm is stopped down.

To achieve the object mentioned above, according to the present invention, there is provided an automatic diaphragm apparatus, comprising a diaphragm opening and closing ring and a diaphragm supporting ring for supporting a plurality of diaphragm blades and for opening and closing a diaphragm aperture in accordance with a relative rotation of the diaphragm opening and closing ring and the diaphragm supporting ring, a diaphragm value setting ring, a releasing member which is actuated upon the shutter release to rotate the diaphragm opening and closing ring to thereby stop-down the latter, and a cam mechanism which operates in association with the rotation of the diaphragm value setting ring to restrict the angular displacement of the diaphragm opening and closing ring into the stopping-down direction, wherein the improvement comprises a stopping-down means for rotating the diaphragm supporting ring into the stopping-down direction in association with the rotation of the diaphragm value setting ring in an angle range from a full open position of the diaphragm value setting ring to a predetermined intermediate diaphragm value.

With this arrangement, the diaphragm is stopped down to a set diaphragm value in a diaphragm range from an open aperture to a predetermined intermediate diaphragm value. Once the diaphragm value is larger than the intermediate value, an automatic diaphragming function becomes effective, so that the diaphragm value is automatically controlled and set by the automatic diaphragm function.

In the diaphragm range from the minimum (or smallest) diaphragm value (full open aperture) to a predetermined intermediate diaphragm value, the diaphragm effect (soft focus effect) can be directly and visibly confirmed through the finder when the diaphragm value is changed. On the other hand, in a diaphragm range from the intermediate diaphragm value to a maximum (or largest) diaphragm value, the automatic diaphragming function operates to stop down the diaphragm to a set diaphragm value immediately before the shutter is released. In a diaphragm range in which the finder should be prevented from becoming dark, the automatic diaphragming function is obtained without confirming the diaphragm effect, since there is no, or very little, need for confirmation.

Another object of the present invention is to provide a lens in which the so-called stop-down metering can be effected in a diaphragm range from a minimum (smallest) diaphragm value to a predetermined intermediate diaphragm value, and the so-called full-aperture metering (exposure measurement at the open aperture) can be effected in a diaphragm range from an intermediate diaphragm value to maximum (largest) diaphragm value.

The present invention is aimed at the provision of the lens in which an aperture diameter changes in accordance with a diaphragm value set by a diaphragm value setting ring in a diaphragm range from a minimum diaphragm value to a predetermined intermediate diaphragm value and no aperture diameter changes in a diaphragm range from an intermediate diaphragm value to a maximum diaphragm value, regardless of the diaphragm value set by the diaphragm value setting ring, wherein the improvement comprises a diaphragm data transmitting device which makes it possible to automatically transmit data of stop-down metering and full-aperture metering from a lens side of a camera to a camera body side of the camera.

According to another aspect of the present invention, further provisions are made to a diaphragm data transmitting member, separate from the diaphragm value setting ring, for transmitting diaphragm value data to a camera body side, and a selective associating mechanism which is provided between the diaphragm value setting ring and the diaphragm data transmitting member to maintain the diaphragm data transmitting member to a predetermined position in the diaphragm range in which the diaphragm aperture changes, regardless of the angular position of the diaphragm value setting ring, and rotates the diaphragm data transmitting member together with the diaphragm value setting ring in the diaphragm range in which no change of the diaphragm the diaphragm aperture occurs in accordance with the angular position of the diaphragm value setting ring.

With this arrangement, on one hand, the stop-down metering can be effected by transmitting the data of the specific position of the diaphragm data transmitting member to the camera body side, and on the other hand, the full-aperture metering can be effected by transmitting the data of the movement of the diaphragm data transmitting member from the specific position to the camera body side. Furthermore, the diaphragm data can be transmitted in accordance with the angular position of the diaphragm data transmitting member which moves from the specific position.

BRIEF DESCRIPTION OF THE DRAWINGS

The invention will be described below in detail with reference to the accompanying drawings, in which.

DESCRIPTION OF THE PREFERRED EMBODIMENTS

Figure 1:
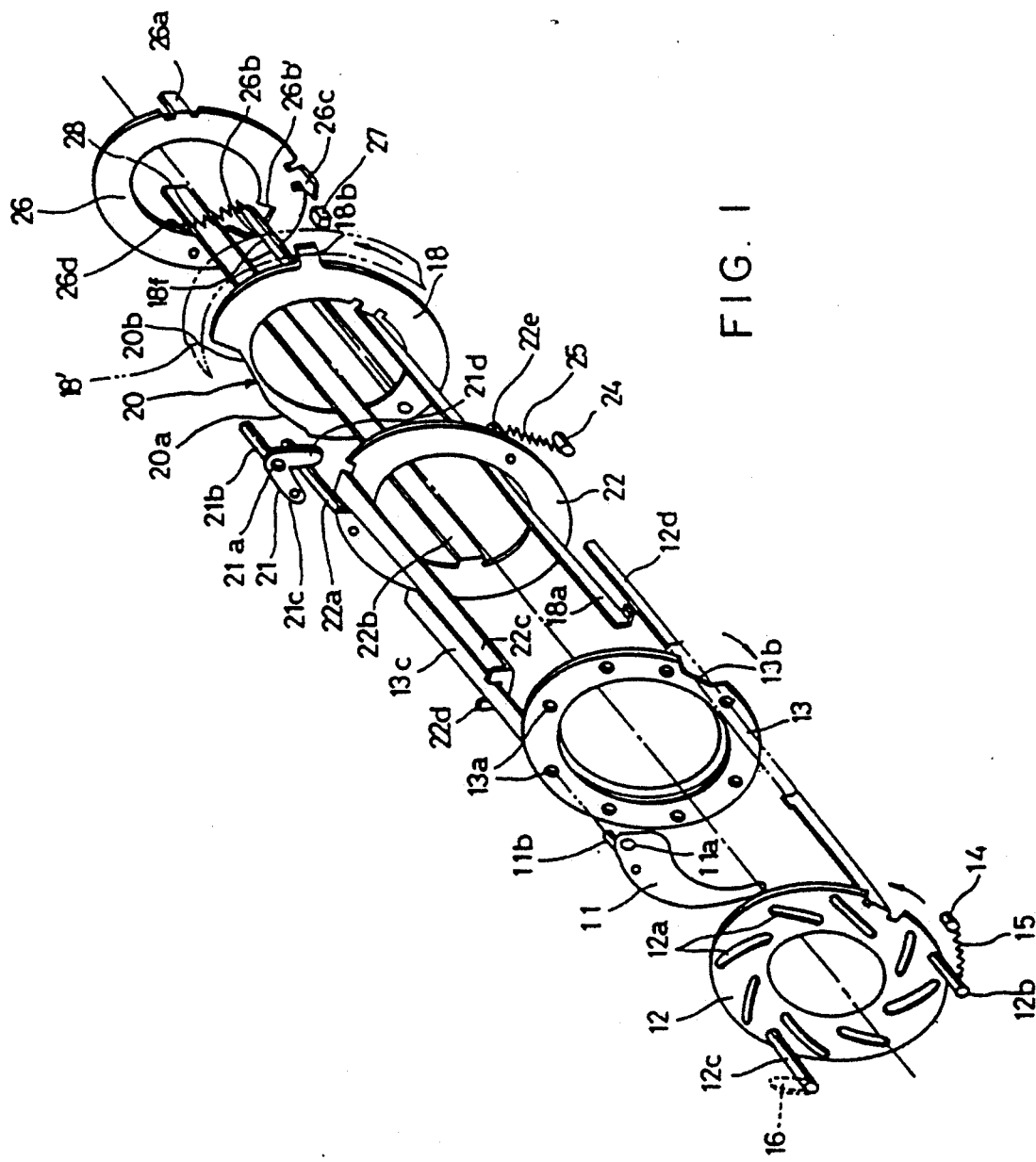
FIG. 1 is an exploded perspective view of an automatic diaphragm apparatus of a lens according to the present invention.

In FIG. 1, each of a plurality of diaphragm blades 11 (only one of which is shown) has projection 11a and 11b on its front and rear surfaces, respectively. The diaphragm blades 11 are held between a diaphragm supporting ring 12 and a diaphragm opening and closing ring 13 which is rotatable relative to the diaphragm supporting ring 12. The projections 11a and 11b of the diaphragm blades 11 are fitted in corresponding cam grooves 12a formed on the diaphragm supporting ring 12 and corresponding supporting holes 13a formed on the diaphragm opening and closing ring 13, respectively. The cam grooves 12a have cam profiles so that when the relative rotation of the diaphragm supporting ring 12 and the diaphragm opening and closing ring 13 takes place, the diaphragm opening (aperture) is opened and closed by the diaphragm blades 11, as is well known.

In the present invention, both the diaphragm supporting ring 12 and the diaphragm opening and closing ring 13 are rotatable, unlike a conventional automatic diaphragm device in which one of the diaphragm supporting rings 12 and the diaphragm opening and closing rings 13 is immovable. The stopping-down direction of the diaphragm is shown at arrows in FIG. 1. The diaphragm supporting ring 12 is continuously biased in the stopping-down direction by a tension spring 15 which is provided between a pin 12b provided on the diaphragm supporting ring 12 and a pin 14 provided on an immovable portion of a lens barrel (not shown). The diaphragm supporting ring 12 has an angular displacement restricting pin 12c and an elongated projection 12d, both extending in a direction parallel with the optical axis. The angular displacement restricting pin 12c is fitted in an associated angular displacement restricting groove 16 formed in an immovable portion of the lens barrel. The elongated projection 12d extends through an escaping groove 13b formed in the diaphragm opening and closing ring 13 to engage with an associated restricting projection 18a of a cam ring 18, which extends parallel to the optical axis.

The diaphragm opening and closing ring 13 has a driven projection 13c which extends parallel to the optical axis toward a release ring 22.

Figure 2:
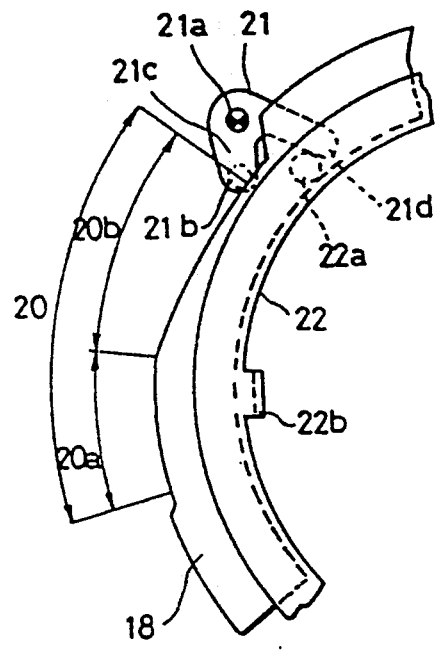
FIG. 2 is a front elevation view of a cam mechanism according to the present invention; and, FIGS. 3a and 3b are front elevation views of a diaphragm data transmitting ring shown in different positions, according to the present invention.

The cam ring 18 is rotated together with a diaphragm value setting ring (diaphragm dial ring) 18' by radial projection 18b. Cam ring 18 is provided on its outer periphery with a cam surface 20 having a first stop-down section 20a and a second stop-down section (automatic stop-down section) 20b (FIG. 2). The first stop-down section 20a has a constant diameter and corresponds to a diaphragm range from a largest aperture (minimum F-number; e.g., F1.4) to a predetermined intermediate diaphragm value (e.g., F4). The second stop-down section (the automatic stop-down section) 20b has a diameter which gradually decreases so as to gradually increase the aperture from the stop-down section 20a and corresponds to a diaphragm range from the intermediate diaphragm value to a smallest diaphragm value (maximum F-number, e.g., F22). The restricting projection 18a pushes the elongated projection 12d against the tension spring 15 when the cam ring 18 is in the open diameter position. The engagement of the restricting projection 18a with the elongated projection 12d is maintained until the cam ring 18 comes to an angular position corresponding to the intermediate diaphragm value.

A cam follower pin 21b of a generally V-shaped intermediate lever 21, which is pivoted to an immovable portion of the lens barrel through a shaft 21a, bears against the cam surface 20 of the cam ring 18. The follower pin 21b is provided on one leg portion 21c of the V-shaped intermediate lever 21. The other leg portion (stop leg portion) 21d of the intermediate lever 21 engages with a stop pin 22a provided on the release ring 22 to restrict the maximum angular displacement of the release ring 22.

The release ring 22 has a rear association bar 22b which extends rearwardly in a direction parallel with the optical axis to be connected to the camera body and a front association bar 22c which extends forwardly in a direction parallel with the optical axis to be connected to the diaphragm opening and closing ring 13. The front association bar 22c has a bifurcated front end 22d in which the driven projection 13c of the diaphragm opening and closing ring 13 is engaged, so that the release ring 22 and the diaphragm opening and closing ring 13 can rotate together in the same direction. The release ring 22 is continuously biased in a stop-down direction by a tension spring 25 which is provided between a pin 22e provided on the release ring 22 and a pin 24 provided on an immovable portion of the lens barrel. Consequently, the diaphragm opening and closing ring 13 is also biased in the same direction as the release ring 22. The rear association bar 22b abuts against a diaphragm driving member (not shown) on a camera body when the diaphragm device is assembled in the camera body, so that the release ring 22 is rotated in a direction to loosen the tension spring 25, that is, in a direction to open the aperture, and is kept in that angular position. The diaphragm driving member on the camera body is disengaged from the rear association bar 22b prior to the shutter release.

The diaphragm data transmitting ring 26 is located behind the release ring 22. The diaphragm data transmitting ring 26 has a data transmitting portion 26a which transmits data discriminating between the stop-down metering and the full-aperture metering and data of the diaphragm value at the full-aperture metering to the camera body, an inner peripheral recess 26b, a stop projection 26c and a spring connecting pin 26d. The stop projection 26c is engaged by a stop member 27 provided on the camera body to restrict the angular displacement of the diaphragm data transmitting ring 26 in the clockwise direction in FIG. 1.

In the peripheral recess 26b of the diaphragm data transmitting ring 26 is fitted an association pin 18f which is provided on the cam ring 18 and which is connected to the diaphragm data transmitting ring 26 through a tension spring 28 connected to the spring engaging pin 26d of the diaphragm data transmitting ring 26. The association pin 18f moves in the circumferential direction in the peripheral recess 26b of the diaphragm data transmitting ring 26 when the cam follower pin 21b comes into contact with the stop-down section 20a of the cam surface 20. In this state, the stop projection 26c bears against the stop member 27 by the spring 28. On the other hand, when the cam follower pin 21b comes into contact with the automatic stop-down section 20b of the cam surface 20 of the cam ring 18, the association pin 18f comes into contact with one end 26b' of the peripheral recess 26b that is adjacent to the stop projection 26c so as to rotate the diaphragm data transmitting ring 26 together against the spring 28.

As can be seen from the drawings, the diaphragm supporting ring 12, the diaphragm opening and closing ring 13, the release ring 22, the cam ring 18, the diaphragm value setting ring 18', and the diaphragm data transmitting ring 26 are all annular members which rotate about the optical axis of the lens.

The apparatus of the present invention as constructed above operates as follows:

In an open aperture position (e.g., F1.4) in which the diaphragm value setting ring 18' is located in a fully open position, the restricting projection 18a of the cam ring 18, which rotates together with the diaphragm value setting ring 18', pushes the association projection 12d of the diaphragm supporting ring 12 by a maximum angular displacement to maintain the diaphragm supporting ring 12 in the open diaphragm position. When the diaphragm setting ring 18', and accordingly, the cam ring 18 are rotated in an angular range between the open position and a predetermined intermediate diaphragm value (e.g., F4), the diaphragm supporting ring 12 is rotated by the tension spring 15 in the stop-down direction in accordance with the rotation of the restricting projection (rod) 18a. Namely, the diaphragm opening (aperture) defined by a plurality of diaphragm blades 11 is stopped down, so that the diaphragm effect (soft focus effect) can be visibly confirmed through the finder.

In the stop-down section 20a (constant diameter portion), the cam surface 20 of the cam ring 18 comes into contact with the cam follower pin 21b of the intermediate lever 21. Accordingly, no rotation of the intermediate lever 21 takes place. Namely, the stop leg portion 21d is maintained in contact with the stop pin 22a of the release ring 22. Consequently, when the shutter is released in the stop-down section, the diaphragm driving member on the camera body side disengages from the rear association bar 22b, so that neither the release ring 22 nor the diaphragm opening and closing ring 13 rotate.

In the stop-down section, the association pin 18f of the cam ring 18 moves in the peripheral recess 26b, extending in the circumferential direction, so that the diaphragm data transmitting ring 26 does not rotate. Namely, the stop projection 26c of the diaphragm data transmitting ring 26 is maintained in contact with the stop member 27, so that the data transmitting portion 26a of the diaphragm data transmitting ring 26 is maintained in position S, shown in FIG. 3b. In position S, signals for stop-down metering are sent to the camera body. As is well known, the stop-down metering is a metering system in which the measurement is effected by light that is actually transmitted through the aperture diameter. Practically speaking, it is possible to detect the quantity of the light which is transmitted through the variable aperture diameter without generating the metering signals depending on the angular position of the data transmitting portion 26a to effect the stop-down metering. Specifically, the data transmitting portion 26a must be fixed in the above mentioned state, and accordingly, it is not always necessary to directly use special stop-down metering data.

When the cam ring 18 reaches a predetermined intermediate diaphragm value (i.e., F4), the angular displacement restricting pin 12c of the diameter supporting ring 12 comes into contact with the end of the angular displacement restricting groove 16 to restrict a further movement of the diaphragm supporting ring 12 in the stop-down direction. When the cam ring 18 further rotates to a smaller aperture position (i.e., larger F-number), the automatic stop-down section 20b of the cam surface 20 comes into contact with the cam follower pin 21b of the intermediate lever 21. As a result, the intermediate lever 21 rotates in accordance with the cam profile of the automatic stop-down section 20b of the cam surface 20, so that the position of the stop leg portion 21d changes. The stop leg portion 21d is disengaged from the stop pin 22a of the release ring 22. In this disengagement position, when the shutter is released, the diaphragm driving member of the camera side is disengaged from the rear association bar 22b immediately before the completion of the shutter release, so that the release ring 22 and the diaphragm opening and closing ring 13 are rotated in the stop-down direction by the spring 25. The angular displacement of the diaphragm opening and closing ring 13 is restricted by the stop pin 22a which comes into contact with the stop leg portion 21d. Accordingly, the aperture upon the shutter release has a diaphragm value set by the diaphragm value setting ring 18'.

Figure 3A:
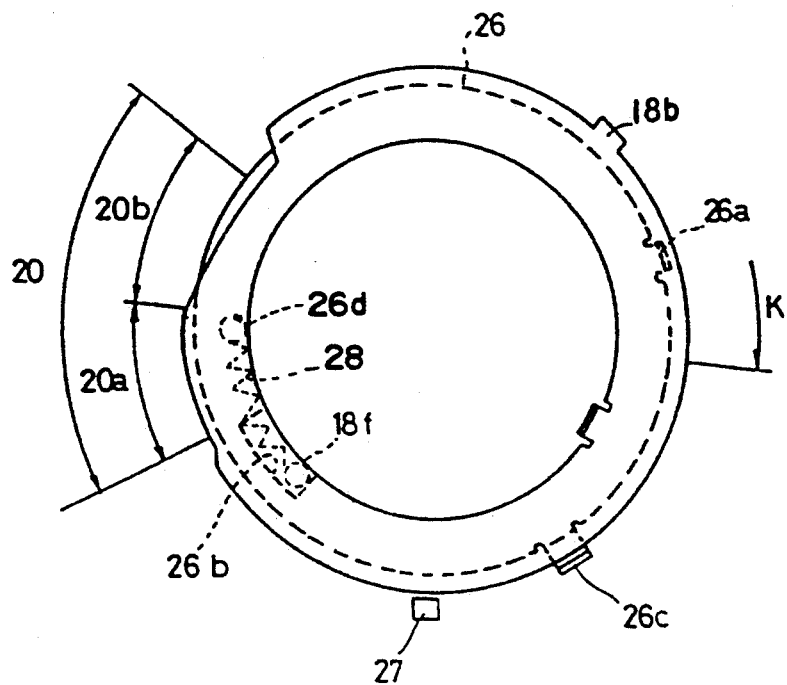
Figure 3B:
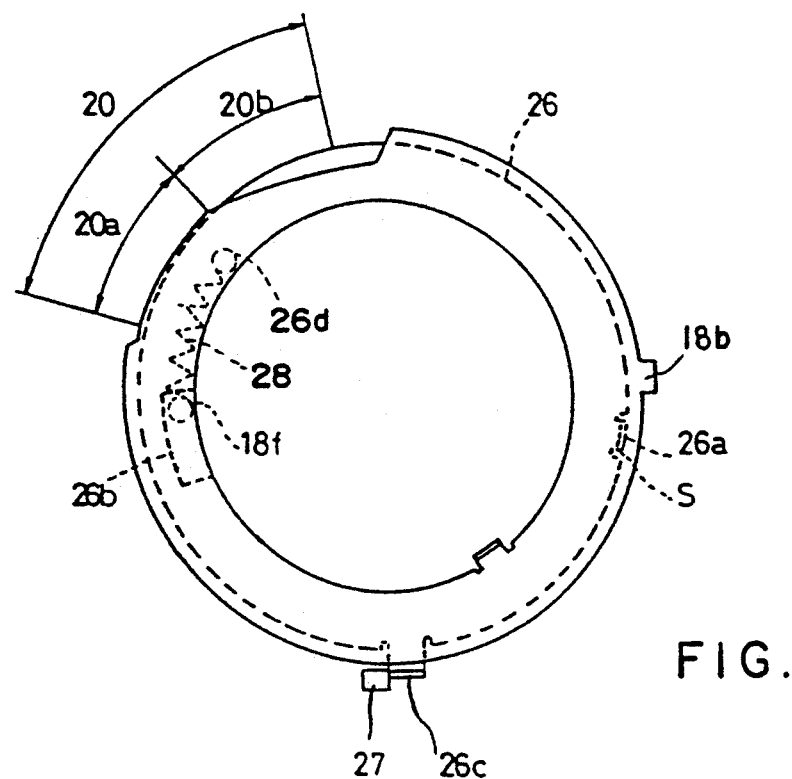

When the cam ring 18 comes to a predetermined intermediate diaphragm value (i.e., F4), the association pin 18f comes into contact with the end 26b' of the peripheral groove 26b of the diaphragm data transmitting ring 26. As a result, when the cam ring 18 further rotates to reduce the aperture diameter, the association pin 18f causes the diaphragm data transmitting ring 26 to rotate together against the tension spring 28. The data transmitting portion 26a of the diaphragm data transmitting ring 26 rotates together with the cam ring 18 to change the position thereof. "K", shown in FIG. 3a, is a section in which the data transmitting portion 26a moves. When the data transmitting portion 26a enters section "K", the signals for full-aperture metering are issued. The diaphragm value data set by the cam ring 18 is transmitted to the camera body in accordance with the angular position of the data transmitting portion 26a. That is, in the automatic stop-down section of the cam ring 18, even if the cam ring 18 rotates, the aperture diameter does not change when no shutter is released. Accordingly, the aperture diameter can be learned in accordance with the position of the data transmitting portion 26a to effect the full-aperture metering.

There are various known automatic diaphragm devices in which the diaphragm is normally opened and set to a desired diaphragm value upon the shutter release and various, known cam mechanisms therefor. The cam mechanism is not limited to that of the illustrated embodiment and can be modified, since the subject of the present invention is not directly directed to the cam mechanism proper.

Although the stop member 27 is provided on the camera body side in the illustrated embodiment, it is possible to provide the stop member on the lens side.

I claim:

1. An automatic diaphragm apparatus of a lens, comprising:
    a diaphragm opening and closing ring and a diaphragm supporting ring for supporting a plurality of diaphragm blades and for opening and closing a diaphragm aperture in accordance with a relative rotation of said diaphragm opening and closing ring and said diaphragm supporting ring;
    a diaphragm value setting ring for setting a diaphragm value;
    a releasing member which is actuated upon a release of a shutter to rotate said diaphragm opening and closing ring so as to stop-down said diaphragm aperture to a final diaphragm value;
    a cam mechanism that operates in association with a rotation of said diaphragm value setting ring to restrict an angular displacement of said diaphragm opening and closing ring into a stopping-down direction; and,
    stopping-down means for rotating said diaphragm supporting ring into a stopping-down direction in association with said rotation of said diaphragm value setting ring in a first angular range from a full open position of said diaphragm value setting ring to a predetermined intermediate diaphragm value thereof, said predetermined intermediate diaphragm value being greater than the diaphragm value corresponding to the full open position, and less than said final diaphragm value to which said diaphragm opening and closing ring is rotated by said releasing member, at the same diaphragm setting, upon release of a shutter, wherein, said diaphragm closes simultaneously with the operation of said diaphragm value setting ring, until said predetermined intermediate value is reached, and said diaphragm is held at said predetermined intermediate diaphragm value for all apertures that are higher than said predetermined intermediate aperture value, prior to shutter release, and is stopped-down to said final diaphragm value only upon shutter release.

2. An automatic diaphragm apparatus according to claim 1, further comprising:
    a diaphragm data transmitting member that is separate from said diaphragm value setting ring for transmitting diaphragm value data to a camera body side of a camera; and,
    a selective associating mechanism which maintains said diaphragm data transmitting member to a predetermined position in said first angular range from said full open position of said diaphragm value setting ring to said predetermined intermediate diaphragm value thereof, regardless of the angular position of said diaphragm value setting ring and which rotates said diaphragm data transmitting member together with said diaphragm value setting ring in a second angular range from said predetermined intermediate diaphragm value of said diaphragm value setting ring to a maximum diaphragm value.

3. An automatic diaphragm apparatus according to claim 2, wherein said cam mechanism comprises a cam ring which rotates together with said diaphragm value setting ring.

4. An automatic diaphragm apparatus according to claim 3, wherein said diaphragm data transmitting member comprises a diaphragm data transmitting ring which rotates about an optical axis of said lens.

5. An automatic diaphragm apparatus according to claim 4, wherein said selective associating mechanism comprises a circumferentially extending elongated groove or hole provided on said diaphragm data transmitting ring and an association pin which projects from said cam ring to be fitted in said circumferentially extending elongated groove or hole, so that said association pin relatively moves in said elongated groove or hole in said first angular range and comes into contact with one end of the elongated groove or hole, to rotate said diaphragm data transmitting ring together with said diaphragm value setting ring in said second angular range.

6. An automatic diaphragm apparatus according to claim 4, wherein said diaphragm data transmitting ring is provided thereon with a data transmitting portion which projects toward said camera body side and which can be fixed at a specific angular position to effect a stop-down metering and can be moved from a specific angular position to effect a full-aperture metering and give said diaphragm value of said full-aperture metering in accordance with a movement of said data transmitting portion.

7. An automatic diaphragm apparatus according to claim 1, further comprising an angular displacement restricting means provided on an immovable portion of said lens for mechanically restricting said angular displacement of said diaphragm supporting ring.

8. The automatic diaphragm apparatus of claim 1, wherein the association of rotation of said stopping down means, and the rotation of said diaphragm value setting is a direct association.

9. The automatic diaphragm apparatus of claim 1, wherein said releasing member rotates said diaphragm opening and closing ring from said predetermined intermediate diaphragm value to said final diaphragm value, upon release of a shutter.

10. The automatic diaphragm apparatus of claim 1, wherein, when said diaphragm value setting ring is adjusted to stop-down said diaphragm aperture from a full open position, said diaphragm begins closing simultaneously with the operation of said diaphragm value setting ring, and, for all aperture value numbers higher than said predetermined intermediate diaphragm value, stops closing at said predetermined intermediate diaphragm value.

11. The automatic diaphragm apparatus of claim 10, wherein said diaphragm is stopped down, from said predetermined intermediate diaphragm value to said final diaphragm value, simultaneously upon shutter release.

12. A diaphragm apparatus of a lens, comprising:
    a diaphragm value setting ring which changes an open aperture;

means for changing said open aperture in accordance with a diaphragm value set by said diaphragm value setting ring in a first diaphragm range that is between a minimum diaphragm value and a predetermined intermediate diaphragm value; and means for maintaining said open aperture at a constant value in a second diaphragm range between said intermediate diaphragm value and a maximum diaphragm value, regardless of a diaphragm value set by said diaphragm value setting ring, wherein, said diaphragm closes simultaneously with the operation of said diaphragm value setting ring, until said predetermined intermediate value is reached, and said diaphragm is held at said predetermined intermediate diaphragm value for all apertures that are higher than said predetermined intermediate aperture value, prior to shutter release, and is stopped-down to said final diaphragm value only upon shutter release.

13. An automatic diaphragm apparatus according to claim 12, further comprising a diaphragm data transmitting member that is separate from said diaphragm value setting ring for transmitting diaphragm value data to a camera body side, and an associating mechanism which is provided between said diaphragm value setting ring and said diaphragm data transmitting member to maintain said diaphragm data transmitting member to a predetermined position in said diaphragm range in which a diaphragm aperture changes, regardless of an angular position of said diaphragm value setting ring and rotate said diaphragm data transmitting member together with said diaphragm value setting ring in said diaphragm range in which no change of said diaphragm aperture occurs.

14. The automatic diaphragm apparatus of claim 12, wherein, when said diaphragm value setting ring is adjusted to stop-down said diaphragm aperture from a full open position, said diaphragm begins closing simultaneously with the operation of said diaphragm value setting ring, and, for all aperture value numbers higher than said predetermined intermediate diaphragm value, stops closing at said predetermined intermediated diaphragm value.

15. The automatic diaphragm apparatus of claim 14, wherein said diaphragm is stopped down, from said predetermined intermediate diaphragm value to said final diaphragm value, simultaneously upon shutter release.

16. An automatic diaphragm apparatus of a lens, comprising:

means for opening and closing a diaphragm aperture in accordance with a relative rotation of a diaphragm ring;

means for setting a diaphragm value;

means for rotating said diaphragm ring upon a release of a shutter so as to stop-down said diaphragm aperture to a final diaphragm value;

means for restricting an angular displacement of said diaphragm ring into a stopping-down direction; and, 17. The automatic diaphragm apparatus of claim 16, further comprising:

means for transmitting diaphragm value data to a camera body side of a camera; and, means for maintaining said diaphragm transmitting means to a predetermined position in said first angular range from said full open position of said diaphragm value setting means to said predetermined intermediate diaphragm value thereof, regardless of an angular position of said diaphragm value setting means and which rotates said diaphragm transmitting means together with said diaphragm value setting means in a second angular range from said predetermined intermediate diaphragm value of said diaphragm value setting means to a maximum diaphragm value.

means for stopping-down said diaphragm aperture in a first angular range from a full open position of said diaphragm value setting means to a predetermined intermediate diaphragm value thereof, said predetermined intermediate diaphragm value being greater than the diaphragm value corresponding to the full open position, and less than said final diaphragm value to which said diaphragm ring is rotated by said rotating means, at the same diaphragm setting, upon release of a shutter, wherein, said diaphragm closes simultaneously with the operation of said diaphragm value setting ring, until said predetermined intermediate value is reached, and said diaphragm is held at said predetermined intermediate diaphragm value for all apertures that are higher than said predetermined intermediate aperture value, prior to shutter release, and is stopped-down to said final diaphragm value only upon shutter release.

18. The automatic diaphragm apparatus of claim 17, wherein said stopping-down means comprises a cam ring which rotates with said diaphragm value setting means.

19. The automatic diaphragm apparatus of claim 16, further comprising means for restricting said angular displacement of said opening and closing means.

20. The automatic diaphragm apparatus of claim 16, wherein, when said diaphragm value setting ring is adjusted to stop-down said diaphragm aperture from a full open position, said diaphragm begins closing simultaneously with the operation of said diaphragm value setting ring, and, for all aperture value numbers higher than said predetermined intermediate diaphragm value, stops closing at said predetermined intermediated diaphragm value.

21. The automatic diaphragm apparatus of claim 20, wherein said diaphragm is stopped down, from said predetermined intermediate diaphragm value to said final diaphragm value, simultaneously upon shutter release.

* * * * *

UNITED STATES PATENT AND TRADEMARK OFFICE
CERTIFICATE OF CORRECTION

PATENT NO. : 5,270,759
DATED : December 14, 1993
INVENTOR(S) : Z. OKURA

It is certified that error appears in the above-indentified patent and that said Letters Patent is hereby corrected as shown below:

On the cover page, section [57] of the printed patent, line 10 of the abstract, change "associated" to ---association---.

UNITED STATES PATENT AND TRADEMARK OFFICE
CERTIFICATE OF CORRECTION

PATENT NO. : 5,270,759
DATED : December 14, 1993
INVENTOR(S) : Z. OKURA

It is certified that error appears in the above-indentified patent and that said Letters Patent is hereby corrected as shown below:

At column 10, line 3 (claim 16, line 12) of the printed patent, insert ---means for stopping-down said diaphragm aperture in a first angular range from a full open position of said diaphragm value setting means to a predetermined intermediate diaphragm value thereof, said predetermined intermediate diaphragm value being greater than the diaphragm value corresponding to the full open position, and less than said final diaphragm value to which said diaphragm ring is rotated by said rotating means, at the same diaphragm setting, upon release of a shutter, wherein, said diaphragm closes simultaneously with the operation of said diaphragm value setting ring, until said predetermined intermediate value is reached, and said diaphragm is held at said predetermined intermediate diaphragm value for all apertures that are higher than said predetermined intermediate aperture value, prior to shutter release, and is stopped-down to said final diaphragm value only upon shutter release.--- on the following line.

Signed and Sealed this

Twenty-fifth Day of February, 1997

Attest:

BRUCE LEHMAN

*Attesting Officer*     *Commissioner of Patents and Trademarks*